United States Patent Office 2,935,160
Patented May 3, 1960

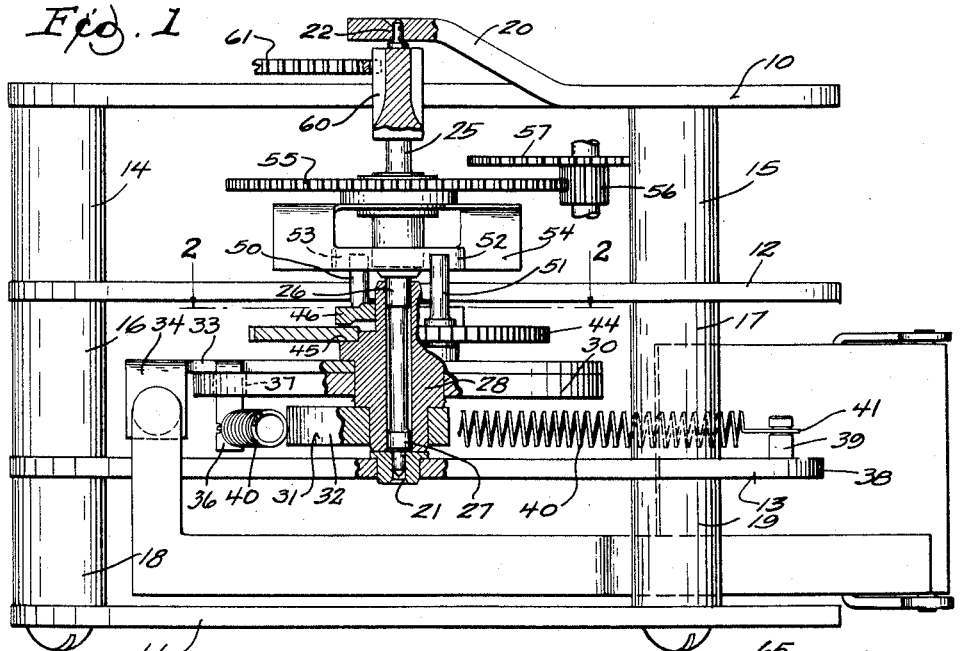
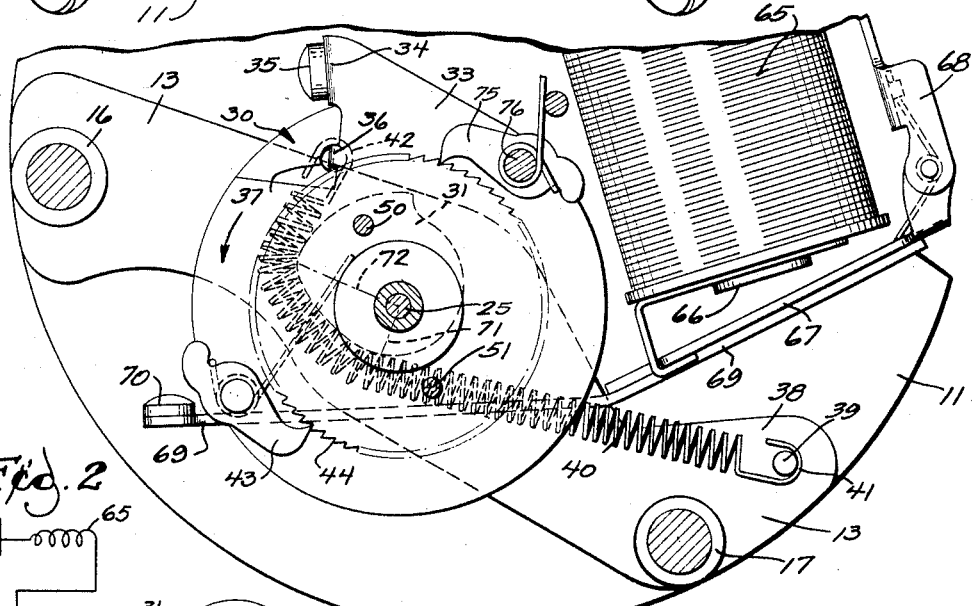
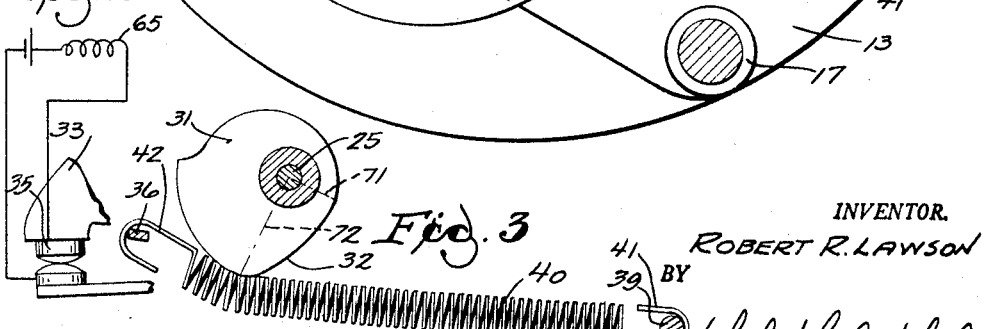

2,935,160
SPRING MOTORS FOR HOROLOGICAL INSTRUMENTS

Robert R. Lawson, Somerset, Wis., assignor to The George W. Borg Corporation, Delavan, Wis., a corporation of Delaware Application March 28, 1957, Serial No. 649,054

5 Claims. (Cl. 185—40)

This invention relates to improvements in spring motors for horological instruments.

Heretofore, attempts have been made to use the relatively cheaper cylindrically helical spring to motivate mechanisms such as the gear trains of horological instruments, not only because the time honored spiral flat spring is more expensive, but because it has actually no portion of its operation between fully wound and fully unwound condition in which it provides anything approaching constant bias, or flat torque "curve." The cylindrically helical spring, when provided with the assistance of a cam in accordance with the instant invention, does provide a substantially flat torque curve throughout the reasonable operating range of its operation as will be understood from the description below. Furthermore, the cylindrically helical spring is more rugged and less subject to breakage than is the flat spiral spring.

It is found that not only is the cylindrical spiral spring admirably adapted to horological instrument motivation if means are found for flattening out the curve of its torque application, but there are also other advantageous features which flow from the use of a cylindrical helical spring as will be described below.

The object of the invention is to provide a cylindrically helical spring motivated driving assembly for horological instrument wherein the torque curve of the spring drive is flattened and, within the small dimension of a horological instrument, the motivating mechanism is most effective and is quiet in its operation.

In the drawings:

Fig. 1 is a side elevation of a clock embodying the invention, certain of the parts mounted upon the motorized driving spindle being broken away and shown in axial section; the clock being shown in "unwound" condition.

Fig. 2 is a section on line 2—2 of Fig. 1 but showing the parts in the position which they assume immediately after a mainspring tensioning operation.

Fig. 3 is a view of the mainspring torque control cam and the electric contact points for the electric spring tensioning means, the parts being shown in the position immediately prior to a spring tensioning operation.

An environment in which the invention is specially adapted for horological instrument motivation is shown in the drawings although it will be understood that the principles of mainspring construction and operation are adaptable to a wide variety of spring mounted instruments. The frame of a clock includes a front plate 10, a rear plate 11, an intermediate plate 12 and a bridge plate 13, these plates being spaced as shown most clearly in Fig. 1 by post spacers 14—15, 16—17 and 18—19, there being another set of post spacers for the front and back plates 10 and 11 and for intermediate plate 12, but not shown in the views appearing in the drawings. The bridge plate 13 and a portion of front plate 10 struck forwardly and spaced as shown in Fig. 1 at 20 provide bearings at 21 and 22 for first wheel shaft 25, and it will be understood that intermediate plate 12 is cut away to permit of the rotation of certain of the parts carried by shaft 25 and included in the spring motorized drive of the clock mechanism as will be described below. Shaft 25 provides at 26 and 27 adequate bearing surfaces to support for free rotation thereon a large hub 28. To this hub 28 there is staked for rotation therewith an inertia wheel 30 and a cam wheel 31, the outer surface 32 of which is shaped in a manner important to this invention.

Secured to the inertia wheel 30, and, in fact, forming a functioning part thereof, is a shock plate 33 having a shock arm 34 extended as shown in Figs. 1 and 2 to provide a mounting for an electric contact point 35. The shock plate is also provided with a spring anchorage extension 36 extended through an opening in the inertia plate as shown in dotted lines at 37 in Fig. 1.

Upon an outlying ear 38 of the bridge 13 is a fixed spring anchorage 39, and it is between this fixed anchorage 39 and the anchorage extension 36 of the shock plate 33 that the mainspring 40 is tensioned so that it may provide the motivating force for clock operation. Each end of the mainspring 40 is formed with a hook 41—42 to be engaged about its anchorage. It is thus obvious that when the mainspring is approaching its relaxed position, it assumes a contour about cam surface 32 as shown in Fig. 3, but when the mainspring is in fully tensioned position, it assumes the contour about the cam as shown in Fig. 2. From a comparison of Figures 2 and 3, it is obvious that a portion of the spring near the anchorage extension 36 moves from one side to the other of the center plane defined by the axis of the wheel shaft 25 and the fixed anchorage 39 to which the other end of the spring is secured.

Since the mainspring drive is so contrived as to apply the driving force of the spring by rotation of shaft 25, the inertia wheel 30 is provided with a spring pawl 43 near the periphery of the inertia wheel and positioned to bear against ratchet wheel 44 mounted for free rotation upon hub 28 and held in position against a shoulder 45 by retaining disk 46 (see Fig. 1). Thus, when the inertia wheel 30 is moved toward the position shown in Fig. 2, the ratchet will freely move over the peripheral teeth of the ratchet wheel 44, but when the spring tension of mainspring 40 pulls the inertia wheel in the direction indicated by the arrow in Fig. 2, the pawl engages a tooth of the ratchet whereby inertia wheel 30 and the ratchet wheel 44 move as a unit in the direction indicated by said arrow.

Firmly staked to ratchet wheel 44 are drive pins 50 and 51 which extend parallel to shaft 25 from which they are respectively equidistant, and they are of sufficient length to respectively contact the two leaves 52 and 53 of a maintaining spring 54 secured to first wheel 55 of an escapement gear train that includes pinion 56 and second wheel 57. The driving force, therefore, of mainspring 40, in moving from the position shown in Fig. 2 to the position shown in Fig. 3, drives through ratchet wheel 44, drive pins 50 and 51, maintaining spring 54, first wheel 55, second wheel 57, and, of course, through a drive pinion 60 engaged with a wheel 61 connected to the hands or other indicating means for the horological instrument.

Of course, it is practicable to provide a single drive pin 50 or 51 to interact with a single leaf 52 or 53 of a maintaining spring. I have shown the twin drive of the two pins and the two leaves as illustrative of one type of alternative maintaining spring drive.

To place the mainspring 40 in fully tensioned position as shown in Fig. 2 an electric coil 65 to temporarily magneticaly energize core 66 is so positioned as to be in effective relation to an armature 67 pivotally mounted upon a bracket 68, and an armature extension 69 is provided with a contact point 70 so positioned as to be in the path of travel of contact point 35 carried by inertia wheel 30 as shown in Fig. 3. The electric circuit for the coil 65 is shown in the drawings, and, as in Figure 3, it will be understood that the points 35 and 70 when in contact with one another complete a circuit through coil 65 whereby to forcibly move armature 67 against the core and thus provide a physical shock impulse to move the inertia wheel 30 in partial rotation from the position shown in Fig. 3 to the position shown in Fig. 2. This is a spring tensioning operation in which the forces involved are ample to tension spring 40 in readiness for a spring motivated completion of an oscillatory movement of the inertia wheel 30.

It will be noted that the cam surface 32 of cam 31 is broad and smooth so that the convolutions of the cylindrically helical spring are supported and the length of spring forced into such a contour as indicated generally in Figs. 2 and 3 that the slow motion torque application for rotation of shaft 25, is represented by a flat torque curve when diagrammed to indicate the torque applied to the shaft. The cam surface is such that when the spring is fully tensioned, the moment arm, represented by the distance between the cam surface 32 and the axis of shaft 25, is quite short. In Fig. 2, this is represented by the dotted line 71 indicating the effective radius of cam wheel 31 when the spring is fully wound. Then, as the escapement mechanism as governing the speed of rotation of the wheels 55—57 permits the "unwinding" of the spring 40, the moment arm increases gradually as the "strength" of the spring bias is lessened until finally the moment arm, at the time a fresh "winding" of the spring is to take place, has increased, in accord with the increased radius on line 72 of the cam wheel.

Of course, the contour of the cam surface 32 may be designed to compensate for any required advantage which the spring may need in operating a particular horological instrument, but fundamentally the radius of the curve of the cam surface with reference to shaft 25 is such that the radius is short as at 71 when the spring is fully wound or tensioned and gradually increases to the radius 72 providing the greatest moment arm just prior to the retensioning or "rewinding" of the spring.

Not only does the provision of cam 31 provide required torque for instrument motivation, but it also has a surprising effect upon the response of spring 40 to vibrations in the phonetic range. For instance, it has been found that in clocks installed in the instrument panels of automotive vehicles, springs of cylindrically helical type such as spring 40 tended to be resonant in response to radio speakers or phonograph operation in close proximity to the instrument panel, but for reasons not yet fully determined, a spring such as the spring shown at 40 when mounted on the cam as shown in the drawings offers no objectionable resonant reaction. It is possible that because of the spaced convolutions of spring 40 in contact with the smooth surface 32 of cam 31, the vibrations are damped sufficiently so that no phonetically objectionable resonance occurs.

Long time operation and tests of cam 31 and a spring 40 shows that the contact of the convolutions of the spring against surface 32 does not to any objectionable degree prevent the convolutions from "creeping" on the surface 32, and it has been found that no groove or special guiding members are necessary at either side of the spring since the cam surface 32 is of sufficient extent laterally of the spring, axially of the axis of the cam.

In operation, the tension of spring 40 fixedly anchored at 39 and extending over surface 32 to movable anchorage 36 rotates the inertia wheel 30 and shock plate 33 in the direction of the arrow as seen in Fig. 2. As the spring is shortened and more convolutions leave their contact with surface 32 of cam 31, the tension on spring 40 decreases but the moment arm for its effective application of rotative force to the inertia wheel 30 is increased so that the effective torque upon shaft 25 is maintained until point 35 contacts point 70. During the continuance of the application of spring drive up to the instant of contact of the points, the rotative force is applied through pawl 43 to ratchet wheel 44 so that drive pins 50 and 51 apply rotative force to maintaining spring leaves 52 and 53 secured to first wheel 55. The clock movement is, therefore, motivated and the leaves 52 and 53 of the maintaining spring 54 are forceably flexed to a slight degree.

At the instant of physical and electrical contact of points 35—70, coil 65 is energized and the armature with its extension 69 is very forceably rotated about the pivot mounting of bracket 68 with the result that the inertia wheel 30 and the anchorage extension of shock plate 33 is given a physical shock impulse sufficient, in view of the inertia of parts 30 and 33, to "throw" the parts to the position shown in Fig. 2. Of course, pawl 43 secured to the shock plate readily moves about the ratchet wheel 44 and engages with a tooth of the ratchet at the point of extreme throw of the inertia plate. Thus the swingable anchorage 36 pulls the spring 40 to its practical full extension and the engagement of the pawl 43 at its new point of engagement with the ratchet wheel harnesses the contractile forces of the spring for a new working phase of the cycle.

There is a pawl 75 mounted upon a fixed pin 76 secured to plate 12 faced in the same direction as pawl 43 to prevent the ratchet wheel 44 from "retreating" during a winding operation. Therefore, a leaf of the maintaining spring bearing against a drive pin 50 or 51 is maintained in tension during the winding operation and a driving force of the maintaining spring provides a measure of bias in a forward driving direction while the spring 40 is being newly tensioned.

During the extremely short interval when the spring is being tensioned, the inertia of ratchet wheel 44 and the drive pins 50 and 51 has insufficient time to respond completely to the reactionary force of the plates 52—53 of the maintenance spring 54 so that there is substantially no opportunity for backlash in the gear train which the motor device including the spring is intended to drive.

It will also be noted that the difference in moment arm between the radius 72 and the radius 71 of cam 32 is also effective to provide the greatest amount of tensioning sweep of the spring 40 in the portion of the arcuate movement of inertia plate 30 accomplished while the core 66 of coil 65 is actively physically thrusting the shock plate 33, and then during the completion of the effective inertia stretching of the spring, there is a lessened moment arm. In other words, the differences in radial extent of the moment arms referred to is effectively suited to this type of spring tensioning mechanism as well as to the application of the motivating power of the spring during the drive of the instrument.

I claim:

1. In a device of a character described, a frame, and means rotatably supported on said frame and including an inertia member, a spring for biasing said rotatable means relative to said frame, means for connecting one end of said spring to said frame and the other end of said spring to said rotatable means, an impulse motor supported on said frame and having a movable impulse member actuated thereby, means including at least one stop member for limiting the range of movement of said impulse member when actuated by said impulse motor, impulse receiving means connected to said inertia member and disposed in the path of movement of said impulse member and arranged to be accelerated by the latter within said range and to be thrown thereby through a further range of movement extending beyond said first-mentioned range for tensioning the spring when the impulse member is actuated, said impulse receiving means and said inertia member being so constructed and arranged that a major portion of the tensioning of said spring is effected in the range of thrown movement of said impulse receiving means beyond said first range by inertia of the inertia member produced by acceleration of said impulse receiving member by said impulse member, means interconnecting the spring and the inertia member to provide a variable moment arm for the spring, said device including a pair of electrical contacts for controlling energization of said impulse motor, one of said contacts being connected for movement with said impulse member and the other contact being connected for movement with said inertia member, and means including said spring for effecting engagement of said contacts to energize said impulse motor thereby causing said impulse motor to actuate said impulse member to effect said thrown movement of the inertia member and therewith movement of said other contact member to achieve contact separation.

2. Apparatus according to claim 1, wherein the means interconnecting the spring and the inertia member includes a cam rotatable with said inertia member and arranged eccentrically with respect to the axis of rotation thereof, said cam having a contoured surface engageable with a portion of said spring to laterally displace said portion to bend the longitudinal axis of the spring in conformity with said contoured surface to permit increased angular movement of said rotatably supported means without changing the direction of torque applied thereto by said spring.

3. In a spring-actuated horological apparatus, a frame and a revolvable member mounted on said frame, a double-ended helical spring carried by said apparatus, means for connecting one end of said spring with the frame and the other end of said spring with said revolvable member for biasing said revolvable member for rotation about a predetermined axis on said frame, a cam secured to the revolvable member and provided with a contoured surface engaging a portion of said spring intermediate its ends and providing a variable moment arm for said spring, means for increasing the tension in said spring by rotation of said revolvable member, means for controlling rotation of said revolvable member for releasing spring tension after energy is stored in the spring, said means for increasing the spring tension comprising an impulse motor, a first member movable by said motor and having a predetermined range of movement, a second member connected to said cam and intially engageable by said first member when the motor is actuated whereby the second member is thrown by said first member to tension the spring, the range of thrown movement of said second member extending beyond the range of movement of said first member, the ends of said spring being movable relative to each other during a change in tension in the spring, said spring being extended by its engagement with said cam so that the total extended length of the spring is substantially greater than the maximum rectilinear distance between the ends of the spring for any position of said revolvable member in which said spring is tensioned.

4. In a spring-actuated horological apparatus, a frame and a revolvable member mounted on said frame, a double-ended longitudinally tensioned spring carried by said apparatus, means for connecting one end of said spring with the frame and the other end of said spring with said revolvable member for biasing said revolvable member for rotation about a predetermined axis on said frame, a cam secured to the revolvable member and provided with a contoured surface engaging a portion of said spring intermediate its ends, means for increasing the tension in said spring by rotation of said revolvable member, means for controlling rotation of said revolvable member for releasing spring tension after energy is stored in the spring, said means for increasing the spring tension comprising an impulse motor, a first member movable by said motor and having a predetermined range of movement, a second member connected to said cam and intially engageable by said first member when the motor is actuated whereby the second member is thrown by said first member to tension the spring, the range of thrown movement of said second member extending beyond the range of movement of said first member, said contour surface providing lateral displacement of said spring portion relative to a line interconnecting said ends to achieve a variable moment arm for the spring for obtaining substantially constant torque at said revolvable member and at the same time provide a range of angular movement of said revolvable member whereby at least a portion of said spring near the end thereof connected to the revolvable member moves past the center plane defined by the axis of said revolvable member and the end of the spring connected to the frame during both tensioning and release of the spring.

5. A spring-equipped apparatus having a frame and an inertia member mounted for oscillation with respect to said frame, a spring anchorage on each of said frame and said inertia member, a spring interconnecting said spring anchorages for biasing said inertia member for rotation about a predetermined axis of oscillation, said inertia member having a hub provided with an exterior contour eccentrically shaped with respect to said axis, the surface of said hub being disposed between said anchorages and engaging a portion of said spring, electromagnet means including a coil and armature movable instantaneously upon energization of the coil, said armature being provided with an extending arm having a contact point, a peripheral contact point upon said inertia member positioned to receive a mechanical impulse from the contact point on said armature arm when the coil is energized, said contact points being included in an electrial circuit for electrically controlling said coil, the contour of said hub providing a varying moment arm for the application of the force of the spring to said inertia member in different angular positions of the latter, said hub providing the greatest effective moment arm in approximately the position of said inertia member in which said contact points are engaged, means including said spring for causing engagement of said contacts, and means including said electromagnet means responsive to engagement of said contacts for actuating said armature to throw said inertia member for storing energy in said spring.

References Cited in the file of this patent

UNITED STATES PATENTS 868,587    Wagner  ---------------- Oct. 15, 1907

FOREIGN PATENTS 661,811    France  ---------------- Mar. 11, 1929